United States Patent Office 3,411,911
Patented Nov. 19, 1968

3,411,911
NOVEL PHOTOGRAPHIC MATERIALS CONTAINING WATER INSOLUBLE INTERPOLYMERS
Thomas K. Dykstra, Rochester, N.Y., assignor to Eastman Kodak Company, Rochester, N.Y., a corporation of New Jersey
No Drawing. Filed May 10, 1965, Ser. No. 454,683
20 Claims. (Cl. 96—87)

ABSTRACT OF THE DISCLOSURE

Photographic emulsions comprising water insoluble interpolymers of acrylic esters and sulfoesters and photographic elements comprising a support and at least one layer containing said water insoluble polymer.

---

This invention relates to novel photographic materials. In one of its aspects, this invention relates to the use of interpolymers of alkyl esters of unsaturated carboxylic acid with sulfoesters of unsaturated carboxylic acids in photographic emulsions. In another of its aspects, this invention relates to photographic elements which contain the aforesaid interpolymers in at least one layer.

Gelatin is generally used in the preparation of photographic silver halide emulsions because of its good dispersing properties and its excellent protective colloid properties. However, gelatin is susceptible to dimensional change when subjected to varying temperature or humidity and like conditions. Various natural and synthetic materials have been proposed as substitutes for gelatin in one or more layers of a photographic element to provide dimensional stability. However, coatings formed by many of these materials tend to be tacky. Furthermore, many of these materials do not exhibit the very good compatibility with gelatin which is needed where only a part of the gelatin is replaced as a vehicle or binding agent in a photographic element. It is evident, therefore, that a substitute for gelatin which exhibits improved dimensional stability but is not subject to such defects will greatly enhance the art.

Accordingly, an object of this invention is to provide novel photographic materials.

It is also an object of this invention to provide a novel photographic element containing a solid, water insoluble interpolymer of an alkyl ester of an unsaturated carboxylic acid with a sulfoester of an unsaturated carboxylic acid.

A further object of this invention is to provide novel photographic elements containing interpolymers which can be used in photographic applications, which interpolymers do not form tacky coatings and are highly compatible with gelatin.

A still further object of this invention is to provide photographic silver halide emulsions in which at least a part of the binding agent for the silver halide comprises an interpolymer as described herein.

Other objects of this invention will become apparent from an examination of the specification and claims that follow.

In accordance with this invention, it has been found that the above objects can be obtained with photographic silver halide elements and emulsions which contain a solid, water insoluble interpolymer of (1) at least about 65%, by weight, of a monomer having the formula:

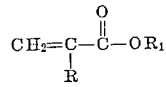

where R is hydrogen or methyl and $R_1$ is an alkyl radical, desirably containing 1–12 carbon atoms, with (2) up to 20%, by weight, of a monomer having the formula:

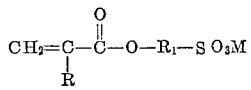

where R is hydrogen or alkyl, $R_1$ has its valence bonds represented in the above formula on different carbon atoms and is a divalent hydrocarbon radical or a divalent aliphatic hydrocarbon radical in which a carbon chain joining the oxygen and sulfur atoms in the formula shown is interrupted by an atom from Group VI–A of the Periodic Table having an atomic weight less than about 33 and M is a cation and (3) 0 to about 20%, by weight, of a polymerizable ethylenically unsaturated monomer that is different from (1) and (2). The Periodic Table referred to herein can be found in "Lange's Handbook of Chemistry," 8th edition (1952), published by Handbook Publishers, Inc., at pages 56 and 57.

The interpolymers employed in practicing this invention are excellent substitutes for gelatin in photographic applications since they not only form coatings which are substantially free of tackiness and resist curl, but they also exhibit excellent dimensional stability, water insolubility, water permeability and do not produce detrimental photographic results. Furthermore, these polymers exhibit good compatibility with gelatin which makes it possible to replace a part of the gelatin in a photographic composition, depending upon the particular combination of properties desired. In addition, many of the interpolymers exhibit excellent salt tolerance, i.e., they do not coagulate in the presence of organic or inorganic salts which are often present in photographic silver halide compositions.

A significant feature of this invention is that the properties which make the polymers employed in this invention suitable gelatin substitutes are closely related to the concentration and nature of the monomers from which the polymers are prepared. For example, more than about 20%, by weight, of a polymerizable ethylenically unsaturated monomer other than the acrylic acid derivatives and the sulfoesters generally gives a polymer with undesirable properties for photographic applications. Furthermore, a substantial increase in the sulfoester content of the interpolymer results in a product which is soluble in water. In addition, the substitution of the alkyl acrylate or methacrylate with such closely related monomers as acrylonitrile results in hard, brittle, film-forming materials which are unsuitable as gelatin substitutes in photographic silver halide emulsions.

Another feature of the solid, water insoluble polymers employed in this invention is that photographic silver halide emulsions containing them often exhibit a marked increase in speed, as shown by Examples 8 and 9 which follow.

As already indicated, the polymers described herein are prepared by interpolymerizing at least two monomers, one of which is a sulfoester of an α-methylene carboxylic acid. The sulfoesters employed in the preparation of these interpolymers include one or more of the sulfoesters having the formula:

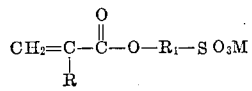

where R, $R_1$ and M are each as defined hereinbefore. Suitable R groups include hydrogen or any of the alkyl radicals, preferably alkyl radicals containing up to about 12 carbon atoms, often 1–8 carbon atoms, as exemplified by methyl, ethyl, propyl, pentyl, octyl, dodecyl and the like. $R_1$ has its valence bonds represented in the above formula on different carbon atoms and can be a hydrocarbon radical or it can be an aliphatic hydrocarbon radical in which a chain of carbon atoms joining the oxygen and sulfur atoms in the formula shown above is interrupted by an atom from Group VI-A of the Periodic Table having an atomic weight less than about 33, i.e., at least one —O— and/or —S— radical interrupts the carbon chain. Where $R_1$ is hydrocarbon, it can be any aliphatic, cycloaliphatic or aromatic radical and will generally contain up to about 12 carbon atoms. Preferred hydrocarbon $R_1$ radicals are alkylene radicals, generally those containing 2–4 carbons. $R_1$ can also be a divalent aliphatic hydrocarbon radical in which there is a —O— and/or —S— radical and generally contains up to 12 carbon atoms. Such $R_1$ radicals can, therefore, be saturated or unsaturated, although saturated divalent alkylene groups in which the carbon chain is interrupted by oxygen and sulfur atoms are preferred. Suitable $R_1$ radicals include, for example, ethylene, 1,3-propylene, 1,2-propylene, tetramethylene, 1,3-isobutylene, pentamethylene, hexamethylene, octamethylene, phenylene, bisphenylylene, naphthylene, cyclopentylene, cyclohexylene, 2-butenylene, butynylene, 2-oxatrimethylene, 3-thiapentamethylene, and the like. M is a cation, as exemplified by hydrogen, an alkali metal such as sodium or potassium, ammonium, the cation of an organic amine such as triethyl amine, diethanol amine and the like.

The sulfoesters can be prepared using any method known to be suitable for this purpose. For example, in U.S. Patent 2,923,734, issued Feb. 2, 1960, it is disclosed that an α-methylene carboxylic acid and an aliphatic hydroxy sulfonic acid in the free form are interacted by heating together, optionally while dispersed in an inert liquid medium capable of forming an azeotrope with water and while azeotropically distilling water out of the reaction mixture to form the corresponding carboxylate ester. The reaction is generally carried out at a temperature between 50° and 200° C. In U.S. Patent 3,024,221, issued Mar. 6, 1962, there is disclosed a method for preparing the sulfoesters by reacting the appropriate acyl halide with the salt of the hydroxy sulfonic acid, generally at a temperature in the range of about 0° to about 200° C., although the particular temperature employed depends upon the nature of the specific reactants. Examples of hydroxy sulfonic acids (and their salts) that can be employed to form the sulfoesters are 2-hydroxyethane sulfonic acid, 2-hydroxy-1-propane sulfonic acid, 1-hydroxy-2-butane sulfonic acid, 2-hydroxycyclohexane sulfonic acid, p-phenolsulfonic acid, 2-(2-hydroxyethoxy)ethane-1-sulfonic acid, 2-(2-hydroxyethylthio)ethane-1-sulfonic acid, 4-hydroxy-2-butene-1-sulfonic acid, 4-hydroxy-2-butyne-1-sulfonic acid and the like. α-Methylene carboxylic acids or acyl halides include acrylic acid, methacrylic acid, α-butylacrylic acid, acryloyl chloride, methacryloyl bromide, α-hexylacryloyl chloride and the like.

The solid interpolymers employed in the photographic silver halide elements of this invention are prepared by copolymerizing at least one sulfoester monomer, as described above, with at least one ethylenically unsaturated acrylic ester having the formula:

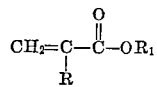

where R is hydrogen or methyl and $R_1$ is an alkyl radical, desirably containing 1–12 carbon atoms and preferably 1–4 carbon atoms. Suitable alkyl radicals include, for example, ethyl, methyl, propyl, pentyl, dodecyl and the like. Suitable monomers include for example, ethyl acrylate, methyl acrylate, butyl acrylate, ethyl methacrylate, octyl methacrylate, and the like. The interpolymers employed in practicing this invention are water insoluble and contain, in polymerized form, at least about 65%, preferably about 85 to about 95%, by weight, of polymerized acrylic ester of the above formula with up to about 20%, preferably about 5 to about 15%, by weight, of sulfoester. If desired, the interpolymers can also contain no more than about 20%, preferably no more than about 10%, by weight, of additional ethylenically unsaturated monomer. Monomeric units of this latter type include those derived from one or more different monomers which are copolymerizable with the acrylates, methacrylates and sulfoesters set forth hereinbefore, i.e., different unsaturated, polymerizable compounds containing one or more —CH=C< groups or more particularly, one or more $CH_2$=C< groups. Useful gelatin substitutes are, therefore, interpolymers of the acrylates, methacrylates and sulfoesters as described above, with other ethylenically unsaturated polymerizable monomers which form water insoluble addition polymers such as vinyl esters, amides, nitriles, ketones, halides, ethers, α,β-unsaturated acids or esters thereof, olefins, diolefins and the like, as exemplified by acrylonitrile, methacrylonitrile, styrene, α-methylstyrene, vinyl chloride, vinylidene chloride, methyl vinyl ketone, vinyl acetate, fumaric, maleic and itaconic esters, 2-chloroethyl vinyl ether, methylenemalonitrile, acrylic acid, methacrylic acid, dimethylaminoethyl methacrylate, N-vinylsuccinimide, N-vinylphthalimide, N-vinylpyrrolidone, butadiene, isoprene, vinylidene cyanide and the like. It is obvious that the nature of the different polymerizable, ethylenically unsaturated compound which is copolymerized with the acrylates, methacrylates and sulfoesters to form the gelatin substitute is subject to wide variation. However, as already indicated, the interpolymers of this invention can contain 0 to about 20%, by weight, of such additional monomer, in polymerized form. Generally, the interpolymers employed in the practice of this invention have a molecular weight in the range of about 5000 to about 500,000 or more.

The temperature at which the interpolymers forming the gelatin substitutes of this invention are prepared is subject to wide variation since this temperature depends upon such variable features as the specific monomers used, the duration of heating, pressure employed, and like considerations. However, the polymerization temperature generally does not exceed about 100° C., and most often, is in the range of about 50° to about 90° C. The polymerization can be carried out in suitable solvents or diluents, for example, water or mixtures of water with water miscible solvents, as exemplified by methanol, ethanol, propanol, isopropyl alcohol, butyl alcohol, and the like. The pressure employed in the polymerization, if any, is usually only sufficient to maintain the reaction mixture in liquid form, although either superatmospheric or subatmospheric pressures can be used. The concentration of polymerizable monomer in the polymerization mixture can be varied widely with concentrations up to about 40 percent, by weight, and preferably about 20 to about 40 percent, by weight, based on the weight of vehicle being satisfactory. Suitable catalysts for the polymerization reaction include, for example, the free radical catalysts, such as hydrogen peroxide, cumene hydroperoxide, water soluble azo type initiators and the like. In redox polymerization systems the usual ingredients can be employed. If desired, the polymer can be isolated from the reaction vehicle by freezing, salting out, coagulation or by using other separation procedures suitable for this purpose. Interpolymers of the type employed in the practice of this invention and a process of preparation are described in U.S. Patent 2,914,499 issued Nov. 24, 1959.

Dispersions of the photographic silver halide in the interpolymers described above, in combination with other binding agents, such as gelatin, can be made in a variety of ways. For example, an aqueous gelatin dispersion of the photographic silver halide can be mixed with an aqueous dispersion of the interpolymer. Alternatively, the photographic silver halide can be precipitated in an aqueous dispersion of the interpolymer and another colloid. In this case, a water soluble silver salt such as silver nitrate is admixed with a water soluble halide such as potassium bromide in the presence of the mixture. In still another procedure, the photographic silver halide is precipitated in an aqueous gelatin solution and digested in the conventional manner known to the art. After digestion, but prior to coating, there is added to the emulsion an aqueous dispersion of the interpolymer described herein. The bulk of the resulting dispersion can be increased by the addition of more of the interpolymer and/or natural or synthetic colloids or binding agents suitable for use in photographic silver halide emulsions. Satisfactory colloids include, for example, gelatin, colloidal albumin, cellulose derivatives, synthetic resins such as polyvinyl compounds and the like.

The gelatin substitutes described herein can be employed in one or more layers of a photographic silver halide element. However, photographic silver halides are generally precipitated in the presence of binding agents such as gelatin or other colloids which exhibit very good peptizing action. Therefore, the photographic silver halide emulsions or layers of this invention will generally contain some binding agent such as gelatin which exhibits this very good peptizing action. Generally, binding agents which comprise about 10 to about 90%, often at least 50%, and most often about 40 to about 65%, by weight, of the interpolymers described herein, give very good results in photographic silver halide emulsions. In the preferred case, the remainder of the binding agent is gelatin, although other colloids also give good results. Where the polymers are used in photographic elements in layers other than the emulsion layers, for example, in filter layers, antihalation layers, antiabrasion layers, antistatic layers and barrier layers, they can be used as the sole vehicle or in admixture with the natural or synthetic colloids mentioned above. The silver halide employed in the preparation of light sensitive coatings described herein includes any of the photographic silver halides as exemplified by silver bromide, silver chloride and silver iodide, or mixed silver halides such as silver chlorobromide, silver bromoiodide, and the like.

The photographic compositions described herein can be coated on a wide variety of supports. Typical supports include polymeric films such as cellulose acetate film, polyvinyl acetal film, polystyrene film, polypropylene film and other polyolefin film, polycarbonate films, polyethylene terephthalate film and other polyester film as well as glass, paper, wood and the like. Supports such as paper which are coated with α-olefin polymers, particularly polymers of α-olefins containing 2–10 carbon atoms as exemplified by polyethylene, polypropylene and ethylene-butene copolymers and the like can also be employed.

The emulsions containing the interpolymers can be chemically sensitized with compounds of the sulfur group, noble metal salts such as gold salts, reduction sensitized with reducing agents, and combinations of these. Furthermore, emulsion layers and other layers present in photographic elements made according to this invention can be hardened with any suitable hardener such as aldehyde hardeners, aziridine hardeners, hardeners which are derivatives of dioxane, oxypolysaccharides such as oxystarch, oxy plant gums, and the like.

The emulsion can also contain additional additives, particularly those known to be beneficial in photographic emulsions, including for example, stabilizers or antifoggants, particularly the water soluble inorganic acid salts of cadmium, cobalt, manganese and zinc as disclosed in U.S. Patent 2,829,404, the substituted triazaindolizines as disclosed in U.S. Patents 2,444,605 and 2,444,607, speed increasing materials, plasticizers and the like. Sensitizers which give particularly good results in the photographic compositions disclosed herein are the alkylene oxide polymers which can be employed alone or in combination with other materials, such as quaternary ammonium salts, as disclosed in U.S. Patent 2,886,437 or with mercury compounds and nitrogen containing compounds, as disclosed in U.S. Patent 2,751,299.

The interpolymers described herein can be used in various kinds of photographic emulsions. For example, they can be used in X-ray and other non-spectrally sensitized emulsions as well as orthochromatic, panchromatic and infrared sensitive emulsions, particularly those sensitized with merocyanine dyes, cyanine dyes, carbocyanine dyes and the like. Furthermore, these polymers can be used in emulsions intended for color photography, for example, emulsions containing color forming couplers or emulsions to be developed by solutions containing couplers or other color generating materials. In addition, these polymers can be used in emulsions intended for use in diffusion transfer processes which utilize the nondeveloped silver halide in the non-image areas of the negative to form a positive by dissolving the undeveloped silver halide and precipitating it on a receiving layer in close proximity to the original silver halide emulsion layer. Such processes are described in Rott U.S. Patent 2,352,014, Land U.S. Patent 2,543,181 and Yackel et al. U.S. Patent 3,020,155. The polymers described herein can also be used in color transfer processes which utilize the diffusion transfer of an imagewise distribution of developer, coupler or dye from a light sensitive layer to a second layer while the two layers are in close proximity to one another. Color transfer processes of this type are described in Yutzy U.S. Patent 2,856,142, Land et al. U.S. Patent 2,983,606, Whitmore et al. British Patents 904,364 and 840,731 and Whitmore et al. U.S. application Ser. No. 392,471, now Patent No. 3,227,552. Silver halide emulsions containing these polymers can be processed in monobath processes such as described in Haist et al. U.S. Patent 2,875,048 or in stabilization type processes.

This invention can be further illustrated by the following examples of preferred embodiments thereof although it will be understood that these examples are included merely for purposes of illustration and are not intended to limit the scope of the invention unless otherwise specifically indicated.

Example 1

A latex of copoly(methyl acrylate-sodium 4-acryloyloxybutane-2-sulfonate) (95:5 weight percent) is prepared in the following manner: 375 ml. of distilled water is placed in a flask, heated to 95° C. and purged of oxygen by bubbling in nitrogen. To the water is added 4 ml. of Triton 770 (a 40% solution of a surfactant composition composed of a sodium alkyl aryl polyether sulfate in isopropanol, manufactured by Rohm and Haas Co.), 1.0 g. of potassium persulfate and 0.1 g. of sodium bisulfite. The following monomer and solution are then added simultaneously under nitrogen with vigorous stirring over a period of 15 minutes: (1) 118.7 g. of methyl acrylate and (2) a solution of 6.3 g. of sodium 4-acryloyloxybutane-2-sulfonate, 0.23 g. of sodium bisulfite and 4 ml. of Triton 770 in 125 ml. of distilled water. After the polymerization mixture is stirred for an additional 30 minutes at 95° C. the resulting latex is chilled and raised to pH 5.0 with an aqueous sodium hydroxide solution.

Similar results are obtained using ethyl acrylate and butyl acrylate in place of methyl acrylate in the above procedure.

Improved dimensional stability is exhibited by photographic materials containing the interpolymers described herein. To illustrate, a fine grain silver chlorobromoiodide emulsion of the lith type containing 40 g. of gelatin/mole silver and 80 g. of the copoly(methyl acrylate-sodium 4-acryloyloxybutane-2-sulfonate) described above/mole silver as the vehicle, is coated on 4 mil polyethylene terephthalate film support at a coverage of 540 mg. of total vehicle/square foot. A pelloid layer with the same vehicle as that used in the emulsion is coated on the under side of the film support at the same coverage.

Dimensional stability determinations made on this film, the support and a film coated with a similar emulsion containing only gelatin as the vehicle (107 g./mole silver) at a coverage of 450 mg. of gelatin per square foot and a gelatin pelloid layer of the same coverage on the under side of the film support are shown in the following table.

Material: Percent dimensional change/ 1% change in relative humidity
- Film support alone _____ .0008
- Gelatin coated support _____ .0029
- Gelatin-interpolymer vehicle coated support __ .0012

Comparison of the above results clearly shows that the dimensional stability of the material coated with part of the emulsion vehicle and the pelloid layer being an interpolymer, as described herein, is greatly improved over the gelatin coated photographic film and is very close to that of the dimensionally stable film support. Furthermore, the gelatin-interpolymer coating is substantially free of tack and is clear and flexible. In addition, a latex of the copoly(methyl acrylate-sodium 4-acryloyloxybutane-2-sulfonate) is resistant to bivalent metal salt solutions as shown by the absence of coagulation upon the addition of such solutions.

Example 2

The polymerization procedure of Example 1 is repeated except that sodium 3-acryloyloxypropane-1-sulfonate is substituted for sodium 4-acryloyloxybutane-2-sulfonate. The copoly(methyl-acrylate-sodium 3-acryloyloxypropane-1-sulfonate) (95:5 weight percent) obtained in the latex has properties similar to those of the polymer of Example 1.

Example 3

A 90:10 weight percent copolymer of methyl methacrylate and sodium 3-acryloyloxypropane-1-sulfonate is prepared by the polymerization procedure of Example 1 using 112.5 g. of methyl methacrylate and 12.5 g. of sodium 3-acryloyloxypropane-1-sulfonate. The latex obtained is salt tolerant and upon coating, forms clear flexible films.

Example 4

The polymerization procedure of Example 1 is repeated using 112.5 g. of methyl acrylate and 12.5 g. of sodium 3-methacryloyloxypropane-1-sulfonate to obtain a latex containing 19.7% solids.

Example 5

As indicated herein, the interpolymer employed in the practice of this invention can contain up to 20 weight percent of one or more ethylenically unsaturated monomers which are different from the alkyl and sulfoesters of the unsaturated carboxylic acids. To illustrate, 106.8 g. of methyl acrylate, 11.9 g. of acrylic acid and 6.3 g. of sodium 3-acryloyloxypropane-1-sulfonate are polymerized by the procedure described in Example 1 with the acrylic acid being dissolved in the methyl acrylate before addition. Upon being coated from the latex, the terpolymer obtained shows good flexibility and water permeability which properties are particularly desirable in photographic applications.

Example 6

The procedure of Example 5 is repeated with 101.3 g. of methyl acrylate, 12.5 g. of glycidyl methacrylate and 11.2 g. of sodium 3-acryloyloxypropane-1-sulfonate. A terpolymer latex containing 20.9% solids is obtained. As shown in the table in Example 7, this terpolymer can be incorporated into photographic elements without detrimentally affecting photographic properties.

Example 7

The interpolymers employed in the practice of this invention can be incorporated in photographic silver halide emulsions to give improved dimensional stability to the photographic element without any detrimental effect on the photographic properties. To illustrate, the following coatings are made. To a fine grain silver chlorobromide emulsion of the lith type containing 70 g. of gelatin per mole of silver, is added the interpolymer latex of the examples listed in the following table in an amount containing 70 g. of interpolymer per mole of silver. The emulsions are coated on a polyethylene terephthalate support at a silver coverage of 412 mg. per square foot. The coated elements are exposed in an Eastman 1 B Sensitometer, processed for 2 minutes in Kodak D–11 developer to give the following results:

| Control | Polymer of Example | Relative Speed | Contrast | Fog |
|---|---|---|---|---|
| Control | | 100 | 5.7 | 0.04 |
| A | 1 | 110 | 5.1 | 0.04 |
| B | 2 | 110 | 4.7 | 0.04 |
| C | 6 | 105 | 5.3 | 0.04 |
| Control | | 100 | 6.3 | 0.04 |
| D | 4 | 94 | 5.5 | 0.04 |
| E | 5 | 118 | 5.7 | 0.04 |

From this table it can be seen that the interpolymers have no adverse effect on the photographic properties of photographic silver halide emulsions containing them. Furthermore, in each case, the photographic elements of Runs A–E show improved dimensional stability and resistance to curl, in comparison to the respective control runs.

Example 8

As already indicated, the interpolymers described herein often produce an increase in speed in the photographic silver halide emulsions into which they are incorporated. Thus, a coarse-grained, silver bromoiodide photographic emulsion of the type used for screen X-ray materials is ripened to optimum sensitivity and then split into several portions. One portion is retained as a control and the copolymer latex of Example 1 is added to other portions as part of the vehicle to give the concentrations of copolymer per mole of silver shown in the table. The emulsions are coated on a polyester film support at a silver coverage of 484 mg. per square foot. The coatings are exposed on an intensity scale sensitometer, developed for 3 minutes in Kodak D–19 developer, fixed and washed to give the following results.

| Copolymer (g./mol Ag) | Relative Speed | Gamma | Fog |
|---|---|---|---|
| None (control) | 100 | 2.95 | 0.10 |
| 20 g | 129 | 2.90 | 0.09 |
| 60 g | 151 | 2.50 | 0.13 |

Example 9

A 20% aqueous dispersion of copoly(methyl acrylate-sodium 4-acryloyloxybutane-2-sulfonate) (80:20 weight percent) is added to a fine grain silver chlorobromoiodide emulsion of the lith type containing 70 g. of gelatin per mole in silver in an amount to give 70 g. of interpolymer per mole of silver. This is coated on a polyethylene terephthalate film support to give a coverage of 456 mg. of silver per square foot. A control coating is made from the emulsion to which 37 g. of gelatin per mole silver is added instead of the polymer dispersion. The coatings are exposed in an Eastman 1 B Sensitometer, developed for 2¾ minutes in a hydroquinone, low sulfite ion developer such as Kodak D–85, fixed, washed and dried to give the following photographic characteristics.

| Run | Relative Speed | Contrast | Fog |
|---|---|---|---|
| Control | 100 | 12.8 | 0.01 |
| Containing Copolymer | 219 | 11.5 | 0.01 |

It can be seen from the above table that an increase in photographic speed is obtained using the polymers of this invention as vehicles or binding agents in photographic silver halide emulsions.

Example 10

The interpolymers of this invention can be employed in various layers of photographic elements other than the silver halide emulsion layer. To illustrate, the terpolymer latex is prepared from 76 weight percent methyl acrylate, 19 weight percent acrylonitrile and 5 weight percent sodium 3-acryloyloxypropane-1-sulfonate by the procedure described in Example 5. On coating this latex over the silver halide emulsion layer of Coating B of Example 7, a good antiabrasion layer is obtained.

Thus, by the practice of this invention there is provided novel photographic silver halide emulsions and photographic elements exhibiting improved properties, particularly dimensional stability. The interpolymers described herein can be used as replacements for all or part of the usual binding agents which are generally employed in photographic elements. For example, the novel interpolymers described herein can be used in photographic silver halide emulsion layers, stripping layers, backing layers, antiabrasion layers and the like.

The invention has been described in detail with particular reference to preferred embodiments thereof, but it will be understood that variations and modifications can be effected within the spirit and scope of the invention as described hereinabove and as defined in the appended claims.

I claim:

1. A photographic silver halide emulsion in which the binding agent comprises a solid, water insoluble interpolymer of (1) at least about 65%, by weight, of a monomer having the formula:

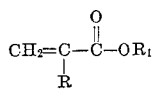

where R is a member selected from the group consisting of hydrogen and methyl and $R_1$ is alkyl, (2) about 5% up to about 20%, by weight, of a monomer having the formula:

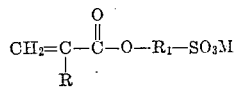

where R is a member selected from the group consisting of hydrogen and alkyl, $R_1$ has its valence bonds represented in the above formula on different carbon atoms and in a member selected from the group consisting of divalent hydrocarbon radicals and divalent aliphatic hydrocarbon radicals in which a chain of carbon atoms joining the oxygen and sulfur atoms of the above formula is interrupted by an oxygen or sulfur atom and M is a cation and (3) 0 to about 20%, by weight, of a polymerizable ethylenically unsaturated monomer that is different from (1) and (2).

2. A photographic silver halide emulsion in which the binding agent comprises a solid, water insoluble interpolymer of (1) about 85 to about 95%, by weight, of a monomer having the formula:

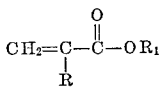

where R is a member selected from the group consisting of hydrogen and methyl and $R_1$ is alkyl, (2) about 5 to about 15%, by weight, of a monomer having the formula:

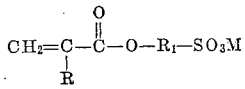

where R is a member selected from the group consisting of hydrogen and alkyl, $R_1$ has its valence bonds represented in the above formula on different carbon atoms and is a member selected from the group consisting of divalent hydrocarbon radicals and divalent aliphatic hydrocarbon radicals in which a chain of carbon atoms joining the oxygen and sulfur atoms of the above formula is interrupted by an oxygen or sulfur atom and M is a cation and (3) 0 to about 10% by weight, of a polymerizable ethylenically unsaturated monomer that is different from (1) and (2).

3. A photographic silver halide emulsion in which the binding agent comprises a solid, water insoluble interpolymer of (1) about 85 to about 95%, by weight, of a monomer having the formula:

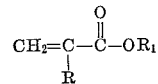

where R is a member selected from the group consisting of hydrogen and methyl and $R_1$ is an alkyl radical containing 1–12 carbon atoms, (2) about 5 to about 15%, by weight, of a monomer having the formula:

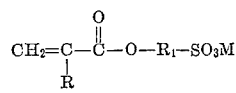

where R is a member selected from the group consisting of hydrogen and alkyl containing 1–12 carbon atoms and $R_1$ has its valence bonds represented in the above formula on different carbon atoms and is a member selected from the group consisting of divalent hydrocarbon radicals containing 1–12 carbon atoms and divalent aliphatic hydrocarbon radicals containing 1–12 carbon atoms in which a chain of carbon atoms joining the oxygen and sulfur atoms of the above formula is interrupted by an oxygen and sulfur atom and M is an alkali metal and (3) 0 to about 10%, by weight, of a polymerizable ethylenically unsaturated monomer that is different from (1) and (2).

4. A photographic silver halide emulsion in which the binding agent comprises a solid, water insoluble interpolymer of (1) about 85 to about 95%, by weight, of a monomer having the formula:

$$CH_2=C-\overset{O}{\overset{\|}{C}}-OR_1$$
$$\underset{R}{|}$$

where R is a member selected from the group consisting of hydrogen and methyl and $R_1$ is alkyl, and (2) about 5 to about 15%, by weight, of a monomer having the formula:

$$CH_2=C-\overset{O}{\overset{\|}{C}}-O-R_1-SO_3M$$
$$\underset{R}{|}$$

where R is a member selected from the group consisting of hydrogen and alkyl, $R_1$ has its valence bonds represented in the above formula on different carbon atoms and is a member selected from the group consisting of divalent hydrocarbon radicals and divalent aliphatic hydrocarbon radicals in which a chain of carbon atoms joining the oxygen and sulfur atoms of the above formula is interrupted by an oxygen or sulfur atom and M is a cation.

5. A photographic silver halide emulsion in which the binding agent comprises a solid, water insoluble polymer of (1) about 85 to about 95%, by weight of an alkyl acrylate, (2) about 5 to about 15%, by weight, of a monomer having the formula:

$$CH_2=C-\overset{O}{\overset{\|}{C}}-O-R_1-SO_3M$$
$$\underset{R}{|}$$

where R is hydrogen, $R_1$ has its valence bonds on different carbon atoms and is a divalent hydrocarbon radical and M is an alkali metal and (3) 0 to about 10%, by weight, of a polymerizable ethylenically unsaturated monomer that is different from (1) and (2).

6. A photographic silver halide emulsion in which the binding agent comprises gelatin and at least 10%, by weight, of a solid, water insoluble polymer of (1) at least about 65%, by weight, of a monomer having the formula:

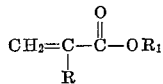

where R is a member selected from the group consisting of hydrogen and methyl and $R_1$ is alkyl, (2) about 5% up to about 20%, by weight, of a monomer having the formula:

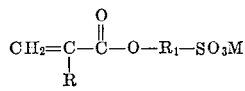

where R is a member selected from the group consisting of hydrogen and alkyl, $R_1$ has its valence bonds represented in the above formula on different carbon atoms and is a member selected from the group consisting of divalent hydrocarbon radicals and divalent aliphatic hydrocarbon radicals in which a chain of carbon atoms joining the oxygen and sulfur atoms of the above formula is interrupted by an oxygen or sulfur atom and M is a cation and (3) 0 to about 20%, by weight, of a polymerizable ethylenically unsaturated monomer that is different from (1) and (2).

7. A photographic silver halide emulsion in which the binding agent comprises gelatin and at least 10%, by weight, of a solid, water insoluble polymer of (1) about 85 to about 95%, by weight, of a monomer having the formula:

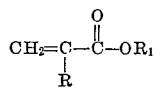

where R is a member selected from the group consisting of hydrogen and methyl and $R_1$ is alkyl, and (2) about 5 to about 15%, by weight, of a monomer having the formula:

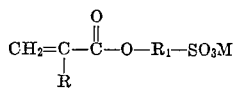

where R is a member selected from the group consisting of hydrogen and alkyl, $R_1$ has its valence bonds represented in the above formula on different carbon atoms and is a member selected from the group consisting of divalent hydrocarbon and divalent aliphatic hydrocarbon in which a chain of carbon atoms joining the oxygen and sulfur atoms of the above formula is interrupted by an oxygen or sulfur atom and M is a cation.

8. A photographic silver halide emulsion in which the binding agent comprises gelatin and at least 10%, by weight, of a solid, water insoluble interpolymer of (1) about 85 to about 95, by weight, of an alkyl acrylate, (2) about 5 to about 15%, by weight, of a monomer having the formula:

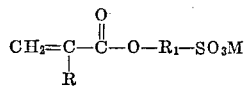

where R is hydrogen, $R_1$ has its valence bonds on different carbon atoms and is a divalent hydrocarbon radical and M is an alkali metal and (3) 0 to about 10%, by weight of a polymerizable ethylenically unsaturated monomer that is different from (1) and (2).

9. A photographic silver halide emulsion in which the binding agent comprises gelatin and at least 50%, by weight, of a solid, water insoluble interpolymer of (1) about 85 to about 95%, by weight, of an alkyl acrylate, (2) about 5 to about 15%, by weight, of a monomer having the formula:

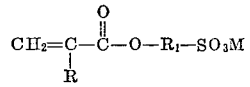

where R is hydrogen, $R_1$ has its valence bonds on different carbon atoms and is a divalent alkylene radical and M is an alkali metal and (3) 0 to about 10%, by weight, of a polymerizable ethylenically unsaturated monomer that is different from (1) and (2).

10. The photographic emulsion of claim 9 in which monomer (3) of the interpolymer is acrylic acid.

11. A photographic silver halide emulsion in which the binding agent comprises about 90 to about 10%, by weight gelatin and about 10 to about 90%, by weight, of a solid, water insoluble interpolymer of (1) about 85 to about 95%, by weight of a monomer having the formula:

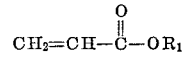

where $R_1$ is an alkyl radical containing 1-4 carbon atoms and (2) about 15 to about 5%, by weight, of a monomer having the formula:

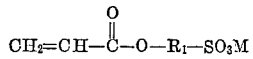

where $R_1$ is an alkylene radical containing 2-4 carbon atoms and M is an alkali metal.

12. A photographic silver halide emulsion in which the binding agent comprises 90 to about 10%, by weight, of gelatin and 10 to about 90%, by weight, of a solid, water insoluble interpolymer of (1) about 85 to about 95%, by weight, of methyl acrylate and (2) about 15 to about 5%, by weight, of sodium 4-acryloyloxybutane-2-sulfonate.

13. A photographic silver halide emulsion in which the binding agent comprises 90 to about 10%, by weight, of gelatin and 10 to about 90%, by weight, of a solid, water insoluble interpolymer of (1) about 85 to about 95%, by weight, of methyl acrylate and (2) about 15 to about 5%, by weight, of sodium 3-acryloyloxypropane-1-sulfonate.

14. A photographic element comprising a support, a photographic silver halide layer, and incorporated in at least one layer of said photographic element, a solid, water insoluble interpolymer of (1) at least about 65%, by weight, of a monomer having the formula:

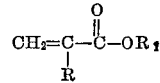

where R is a member selected from the group consisting of hydrogen and methyl and $R_1$ is alkyl, (2) about 5% up to about 20%, by weight. of a monomer having the formula:

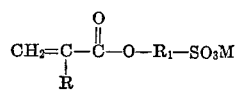

where R is a member selected from the group consisting of hydrogen and alkyl, $R_1$ has its valence bonds represented in the above formula on different carbon atoms and is a member selected from the group consisting of divalent hydrocarbon and divalent aliphatic hydrocarbon in which a chain of carbon atoms joining the oxygen and sulfur atoms of the above formula is interrupted by an oxygen or sulfur atom and M is a cation and (3) 0 to about 20%, by weight, of a polymerizable ethylenically unsaturated monomer that is different from (1) and (2).

15. A photographic element comprising a support, photographic silver halide layer and, incorporated in at least one layer of said photographic element, a solid, water insoluble interpolymer of (1) about 85 to about 95%, by weight, of a monomer having the formula:

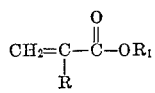

where R is a member selected from the group consisting of hydrogen and methyl and $R_1$ is lower alkyl, (2) about 5 to about 15%, by weight, of a monomer having the formula:

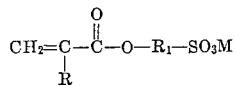

where R is a member selected from the group consisting of hydrogen and alkyl, $R_1$ has its valence bonds represented in the above formula on different carbon atoms and is a member selected from the group consisting of divalent hydrocarbon and divalent aliphatic hydrocarbon in which a chain of carbon atoms joining the oxygen and sulfur atoms of the above formula is interrupted by an oxygen or sulfur atom and M is a cation and (3) 0 to about 10%, by weight, of a polymerizable ethylenically unsaturated monomer that is different from (1) and (2).

16. A photographic element comprising a photographic silver halide layer superimposed upon a polyethylene terephthalate support and, incorporated in at least one layer of said photographic element, a solid, water insoluble interpolymer of (1) about 85 to about 95%, by weight, of monomer having the formula:

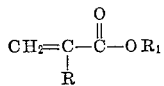

where R is a member selected from the group consisting of hydrogen and methyl and $R_1$ is alkyl, (2) about 5 to about 15%, by weight, of a monomer having the formula:

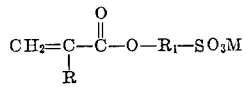

where R is a member selected from the group consisting of hydrogen and alkyl, $R_1$ has its valence bonds represented in the above formula on different carbon atoms and is a member selected from the group consisting of divalent hydrocarbon and divalent aliphatic hydrocarbon in which a chain of carbon atoms joining the oxygen and sulfur atoms of the above formula is interrupted by an oxygen or sulfur atom and M is a cation and (3) 0 to about 10%, by weight, of a polymerizable ethylenically unsaturated monomer that is different from (1) and (2).

17. A photographic element comprising a photographic silver halide layer superimposed upon a polyethylene terephthalate support and, incorporated in at least one layer of said photographic element, a solid, water insoluble interpolymer of (1) about 85 to about 95%, by weight, of a monomer having the formula:

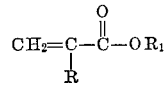

where R is a member selected from the group consisting of hydrogen and methyl and $R_1$ is alkyl, and (2) about 5 to about 15%, by weight, of a monomer having the formula:

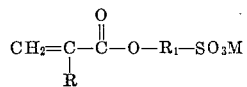

where R is a member selected from the group consisting of hydrogen and alkyl, $R_1$ has its valance bonds represented in the above formula on different carbon atoms and is a member selected from the group consisting of divalent hydrocarbon and divalent aliphatic hydrocarbon in which a chain of carbon atoms joining the oxygen and sulfur atoms of the above formula is interrupted by an oxygen or sulfur atom and M is a cation.

18. A photographic element comprising a photographic silver halide layer superimposed upon a polyethylene terephthalate support and a binding agent for said silver halide comprising about 90 to about 10%, by weight, gelatin and about 10 to about 90%, by weight, of a solid, water insoluble interpolymer of (1) about 85 to about 95%, by weight, of a monomer having the formula:

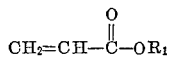

where $R_1$ is an alkyl radical containing 1–4 carbon atoms and (2) about 15 to about 5%, by weight, of a monomer having the formula:

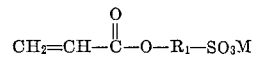

where $R_1$ is an alkylene radical containing 2–4 carbon atoms and M is an alkali metal.

19. A photographic element comprising a photographic silver halide layer superimposed upon a polyethylene terephthalate support and a binding agent for said silver halide comprising about 10 to about 90%, by weight, of gelatin and 10 to about 90%, by weight, of a solid, water inosluble interpolymer of (1) about 85 to about 95%, by weight, of methyl acrylate and (2) about 15 to about 5%, by weight, of sodium 4-acryloyloxybutane-2-sulfonate.

20. A photographic element comprising a photographic silver halide layer superimposed upon a polyethylene terephthalate support and a binding agent for said silver halide comprising about 10 to about 90%, by weight, of gelatin, and 10 to about 90%, by weight, of a solid, water insoluble interpolymer of (1) about 85 to about 95%, by weight, of methyl acrylate and (2) about 15 to about 5%, by weight, of sodium 3-acryloyloxypropane-1-sulfonate.

References Cited

UNITED STATES PATENTS

| | | | |
|---|---|---|---|
| 2,914,499 | 11/1959 | Sheetz | 260—79.3 XR |
| 3,024,221 | 3/1962 | Le Fevre et al. | 260—79.3 |
| 3,033,833 | 5/1962 | Le Fevre et al. | 260—79.3 |
| 3,241,969 | 3/1966 | Hart et al. | 96—114 XR |

FOREIGN PATENTS

| | | |
|---|---|---|
| 1,053,308 | 3/1959 | Germany. |
| 1,134,831 | 8/1962 | Germany. |

NORMAN G. TORCHIN, *Primary Examiner.*

R. H. SMITH, *Assistant Examiner.*